United States Patent [19]
Mize et al.

[11] Patent Number: 5,402,636
[45] Date of Patent: Apr. 4, 1995

[54] ANTI-CONTAMINATION THRUST BALANCING SYSTEM FOR GAS TURBINE ENGINES

[75] Inventors: Christopher D. Mize, Palm Beach Gardens, Fla.; William W. Pirsig, Manchester; Peter T. Vercellone, North Haven, both of Conn.

[73] Assignee: United Technologies Corporation, Hartford, Conn.

[21] Appl. No.: 163,098

[22] Filed: Dec. 6, 1993

[51] Int. Cl.⁶ ............................ F02C 7/12; F02C 7/28
[52] U.S. Cl. .................... 60/39.75; 415/115; 415/173.7
[58] Field of Search ............... 60/39.75; 415/115, 116, 415/173.7, 174.4, 174.5

[56] References Cited

U.S. PATENT DOCUMENTS

| | | | |
|---|---|---|---|
| 3,989,410 | 11/1976 | Ferrari | 415/115 |
| 4,375,891 | 3/1983 | Pask | 415/115 |
| 4,466,239 | 8/1984 | Napoli et al. | 415/173.7 |
| 4,526,511 | 7/1985 | Levine | 416/95 |
| 4,730,978 | 3/1988 | Baran | 415/115 |
| 4,822,244 | 4/1989 | Maier et al. | 415/115 |
| 5,143,512 | 9/1992 | Corsmeier et al. | 415/115 |

*Primary Examiner*—Louis J. Casaregola
*Attorney, Agent, or Firm*—Norman Friedland

[57] ABSTRACT

A buffer zone disposed between the TOBI (tangential on-board injector) discharge cavity and the forward rotor cavity of a gas turbine engine serves to maintain the TOBI air relatively pollutant free by judiciously controlling the flow to maintain the pressure of the buffer cavity below the adjacent cavities. The buffer cavity air and the forward rotor cavity air are bled to the dead rim area of the turbine rotor disk through tangentially oriented discharge ports formed in the circumferentially spaced plenums formed in the stator support. Plates on the bottom of some of the plenums block off the flow from the forward rotor cavity and buffer air from the buffer cavity flows through these closed of plenums to maintain the proper pressure relationship amongst the cavities.

6 Claims, 3 Drawing Sheets

ANTI-CONTAMINATION THRUST BALANCING SYSTEM FOR GAS TURBINE ENGINES

TECHNICAL FIELD

This invention relates to thrust balancing for gas turbine engines and particularly to a thrust balancing system by creating pressurized cavities adjacent the tangential on-board injector (TOBI) and preventing the air of the TOBI from becoming polluted.

BACKGROUND ART

As is well known thrust balancing in a twin spool, axial flow, gas turbine engine is manifested by controlling the leakage of certain seals between the adjacent cavities to attain predetermined pressure levels. Typically, the cavity adjacent the TOBI is one of the cavities that is utilized to maintain this thrust balancing relationship. The TOBI, which sometimes is referred to by other names, serves to direct accelerated cooling air tangentially to the turbine for the purpose of cooling the turbine disks and turbine blades.

TOBIs utilized to inject cooling air to the turbine rotor of a gas turbine engine are aptly described in U.S. Pat. No. 4,822,244 granted to Maier et al on Apr. 18, 1989 entitled "TOBI" and U.S. Pat. No. 4,730,978 granted to Baran, Jr. on Mar. 15, 1988, entitled "Cooling Air Manifold For A Gas Turbine Engine", both of which are assigned to United Technologies Corporation, the assignee common with this patent application. Also U.S. Pat. No. 3,989,410 granted to Ferrari on Nov. 2, 1976 entitled "Labyrinth Seal System" discloses an accelerator (another name for TOBI) that likewise directs cooling air tangentially to the turbine rotor. For further details of the TOBI throughout this patent application reference should be made to these aforementioned patents that are incorporated herein by reference.

In the engine configuration disclosed in the latter patent the thrust balancing is occasioned by maintaining the pressure level in two adjacent cavities to be identical and allowing the flow leakage across the seal between the two cavities to migrate in either direction. Hence the flow in either cavity can migrate to the other depending on the pressure levels in these adjacent cavities. If foreign particles are in the upstream cavity this foreign matter can flow into the downstream cavity and ultimately into the internal cooling passages of the turbine blades. Additionally, this leakage air could eventually mix with TOBI air so as to cause the TOBI air to be at a temperature and pressure that is less than ideal. The addition of means would have to be provided to compensate for this adverse condition which otherwise would result in a deficit in engine operating performance.

In other engine configurations, specialized and expensive, complex seals were employed adjacent the engine shaft in order to attempt to prevent foreign matter from migrating into the turbine blade cooling passages. Of course, with the advent of higher performance engines where the turbine inlet temperature is designed to run hotter than heretofore known designs in order to enhance engine performance the turbine blades are designed with additional holes in the blade to attain a cooler blade to accommodate these higher temperatures. In order to increase the number of cooling holes in these blades it is typical to fabricate the blades with smaller diameter holes, which exhibit propensity to clog and, hence, increase the problems associated with foreign particles carried in the cooling air stream.

We have found that we can obtain the thrust balancing feature and obtain anti-contamination means by incorporating a buffer cavity between two axially spaced seals. The buffer cavity will allow the pressure in the cavity fore of the turbine rotor (FRC) to be increase to a value that is higher than the cavity at the discharge end of the TOBI (TDC) by creating a pressure sink between the two cavities. The pressure in the buffer cavity will be maintained just below the pressure in the TDC and well below the pressure in the FRC by linking it to an even lower pressure area near the engine's flow path with six of the eleven plenums communicating with the dead rim area. This fluid communication with the low pressure area will cause air from the FRC and the TDC to leak into the buffer cavity and out into the engine's flow path. As air continuously leaks out of the TDC and TDC is not polluted.

This invention contemplates that the air that exits through these six plenums will be accelerated and directed tangentially (TOBIed) to provide turbine disk cooling at the dead rim area. The six plenums that are designated to provide buffer flow which are designed identical to the remaining five plenums will include cover plates that are not included in these five plenums so as to cover the openings communicating with the space between the two seals to separate the plenums from the FRC and open a path to the low pressure region. The remaining five plenums will utilize the high pressure FRC's air for increased rim cooling by TOBiing the air through TOBIed holes that are identical to the other six plenums except for the abscense of cover plates. These five plenums will provide the required dump into the flowpath needed to maintain cooling across the first stage turbine rotor.

SUMMARY OF THE INVENTION

An object of this invention is to provide an improved rear thrust balancing and anti-contamination system for a gas turbine engine.

A feature of this invention is to provide a buffer zone between two seals that defines a pressure sink of a predetermined pressure level.

A feature of this invention is to provide a plurality of circumferentially spaced plenum chambers disposed in proximity to the TOBI.

The cover plates isolate the buffer plenums from the FRC. All of the plenums of this design include holes at the bottom end which are included in the casting for removal of the core used in the casting process. In existing plenums these holes are intentionally not covered in the bypass plenums to allow flow through the plenum cavity directly from the FDC. In the buffer plenums the cover plates serve to seal the plenum from the FDC and only allow flow from the buffer cavity to flow through these plenums.

The passages communicating with the plenum chambers are judiciously oriented with respect to the rotating turbine disk to direct the discharging flow tangentially to the disk dead rim area to cool this portion of the turbine rotor. The level of pressure discharging from alternate plenums is sufficiently high to maintain cooling flow across the turbine rotor.

The foregoing and other features of the present invention will become more apparent from the following description and accompanying drawings.

BEST MODE FOR CARRYING OUT THE INVENTION

Figure 1:
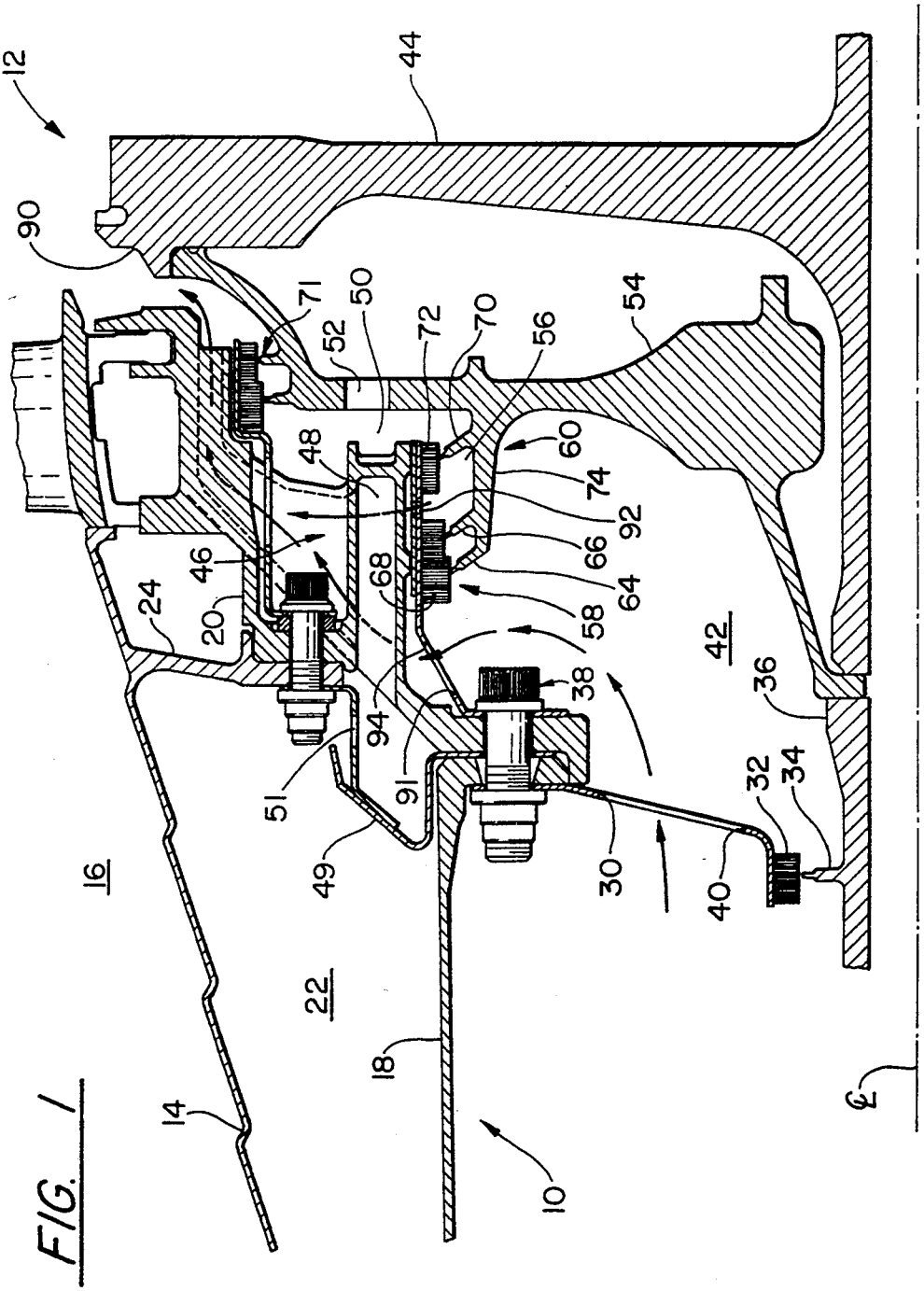
FIG. 1 is a fragmentary view in section of the first stage turbine section of an axial flow gas turbine engine employing this invention.
Figure 2:
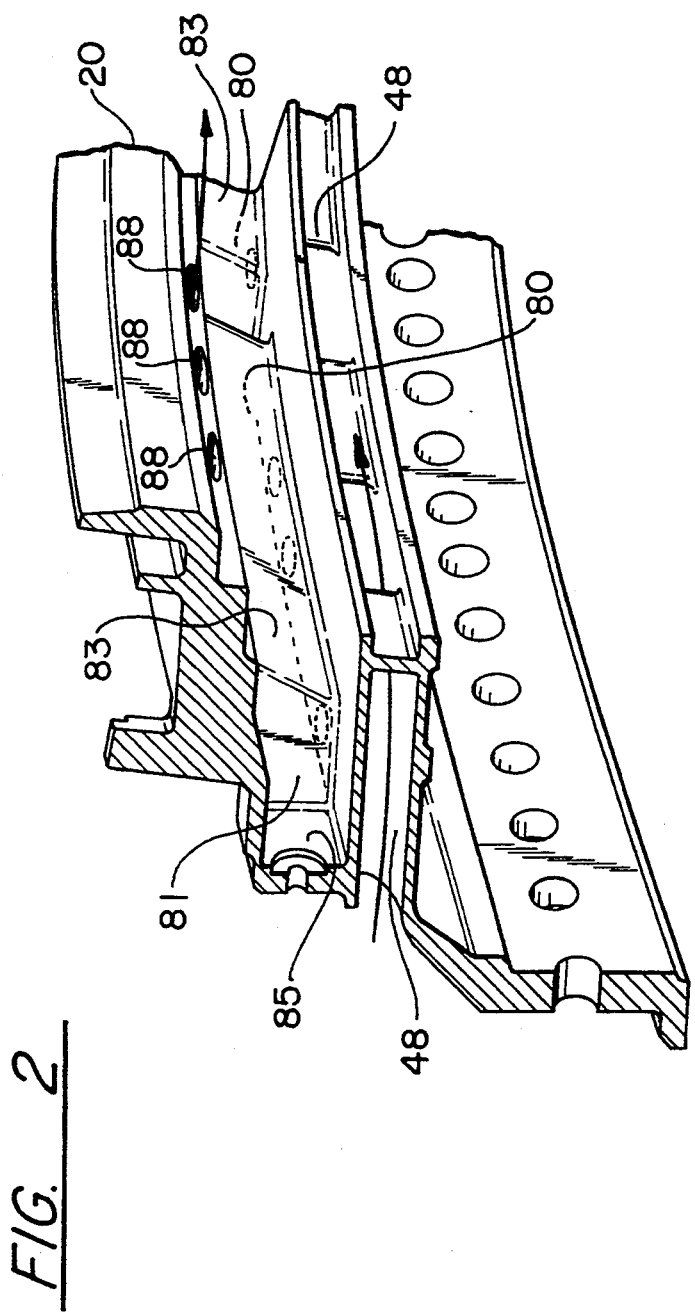
FIG. 2 is a fragmentary perspective view in section illustrating the plenum arrangement of FIG. 1.
Figure 3:
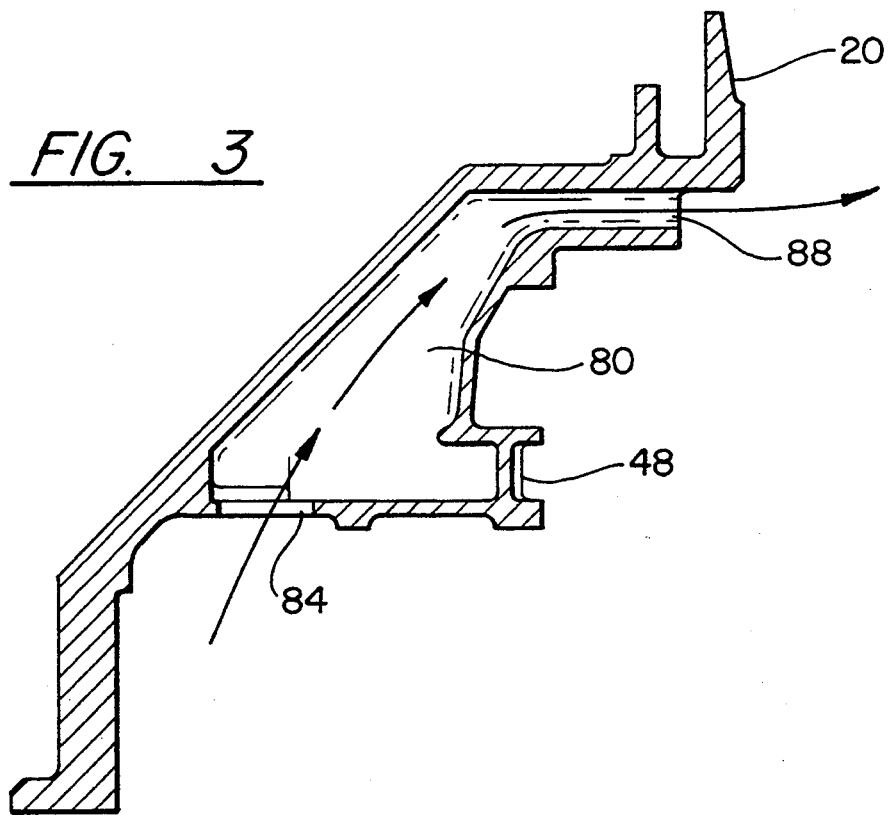
FIG. 3 is a partial view in section illustrating one of the plenums of FIG. 2.
Figure 4:
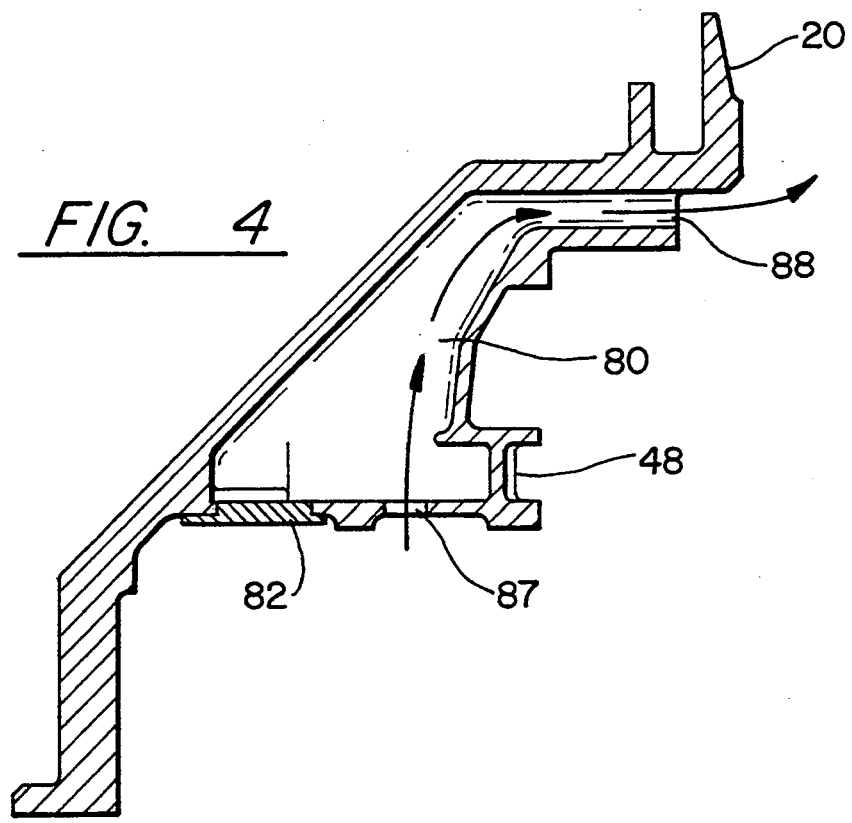
FIG. 4 is a partial view in section illustrating the next adjacent plenum to the one depicted in FIG. 3.

The invention can best be understood by referring to FIGS. 1-4 that show a portion of the combustor section including the diffuser case 18 generally illustrated by reference numeral 10 and the turbine section generally illustrated by the reference numeral 12 of an axial flow gas turbine engine. The combustor includes the annular shaped combustion liner portion 14 that is coaxially mounted about the engine center line A defining the combustion chamber 16. The diffuser inner case 18 is supported to the stator support 20 by the depending flange 24 and attached thereto by a plurality of circumferentially spaced nut and bolts (one being shown). Diffuser inner case 18 is likewise annular shaped, concentric to, and spaced relative to the liner 16 defining an annular passage or cavity 22. Cavity 22 is in communication with the compressor section (not shown) for supplying cooling air to the combustor liner, engine components and the turbine section components.

The annular shaped rotor support 30 having platen 32 formed at its inward end is in close proximity to knife edge 34 extending from the main engine shaft 36. Rotor support 30 is supported to the diffuser case 18 and attached thereto by the nut and bolt assemblies 38 that also supports the stator 20 and serves to prevent the engine shaft and attached rotor from dropping during disassembly of the engine so as to protect the tips of the rotor blades. A plurality of openings 40 (one being shown) circumferentially spaced in rotor support 30 allows compressor discharge air to flow toward the forward rotor cavity 42. There is virtually no pressure drop across openings 40 so that the pressure immediately upstream and downstream thereof for all practical purposes is equal.

In accordance with this invention the flow through the openings 40 flows therethrough without a pressure drop so that the pressure in cavity 42 is the same as the high pressure upstream of openings 40. The reason for maintaining the pressure at this high value will become apparent in the description to follow herein below.

It will be appreciated that the pressure in cavity 10 which is in fluid flow communication with the air discharging from the last stage of the engine's compressor (not shown), will be at a pressure level that is substantially the same as the compressor discharge air. Obviously, this imposes a high pressure load in the forward direction on the compressor rotor (not shown). If the pressure in cavity 42 is made low by having the rotor support 30 act as a seal there will be a small rearward load on the turbine. Thus, the thrust bearing (not shown) would otherwise have to make up the difference. By keeping the pressure in cavity 42 at a high level, the forces acting therein cancels out the high forward load induced by the forces created by the pressure in cavity 10.

As mentioned above, the TOBI serves to direct flow for cooling the turbine rotor by accelerating the cooling flow and directing it tangentially to the turbine rotor disk supported to engine shaft 36. The TOBI generally indicated by reference numeral 46 is comprised of a plurality of passageways 48 that are circumferentially space in the stator 20. Coolant air from the compressor (not shown) admitted into the annular cavity 22 formed between the combustor liner 14 and the diffuser case 18 serves to feed coolant flow to each of the passageways 48 where it is tangentially discharged in the TOBI discharge cavity 50 and to the rotor disk 44 through the plurality of circumferentially spaced openings 52 (one being shown) formed in the front rim support disk member 54 which is attached to and rotates with engine shaft 36. A dirt deflector 49 serves to deflect foreign matter away from TOBI passageways 48 to keep the TOBI air as free from pollutants as possible. Cooling air is admitted into TOBI passageways via the circumferentially spaced openings 51 (one being shown) formed in dirt deflector 49.

In accordance to this invention a buffer cavity 56 is formed by spaced labyrinth seals 58 and 60 disposed beneath the TOBI passageways 48. Labyrinth seals are formed by the annular knife edges 64 and 66 bearing against annular platen 68 and annular knife edge 70 bearing against platen 72. The labyrinth seals seal the buffer cavity from the forward rotor cavity 42 and the TOBI discharge cavity 50. The TOBI discharge cavity is bounded by labyrinth seals 60 and 71 and front rim support disk 54. Knife edges 64, 66 and 70 carried by annular arm 74 extending axially from the front rim disk support 54 and rotates therewith cooperate with platens 66 and 68. All the platens described herein are formed from a metallic honeycomb material, typically used in aircraft engine seals. As one skilled in the art will appreciate, the leakage through the seals can be controlled by the particular tolerances of the mating parts so as to control and maintain a given pressure in the buffer cavity 56 that bears a given relationship to the pressures in the adjacent forward rotor cavity 42 and the TOBI discharge cavity 50. It will be appreciated that the openings 52 (one being shown) in the front rim disk 54 provides no pressure losses so that the pressure immediately upstream and downstream thereof for all practical purposes are equal.

The heretofore known stator supports of the type shown as element 20 generally include a plurality of plenums formed above the TOBI passageways. The plenums serve to receive cooling air from the forward rotor cavity and direct a portion of the cooling air directly into the engine's flow path to maintain cooling across the extremities of the rotor and another portion to the dead rim area 90 of the rotor disk. In this embodiment the plenums 80 are formed in the stator above the TOBI passageways 48 and extend circumferentially to define eleven (11) separate plenums defined by the front walls 81, side walls 83 and back wall 85. Each of these plenums include holes on the bottom end which are exposed to the bypass plenums. This serves to allow flow through these eleven plenums directly from the forward rotor cavity 42.

In accordance with this invention six of the eleven plenums, each of which alternate with the remaining five plenums, are covered at the lower extremity with cover plates 82 to block off the flow entering some of the orifices 84 in order to limit the amount of air ingressing into these plenums. The pressure in the buffer cavity 56 is maintained below the TOBI discharge pressure in cavity 50 and well below the pressure in the forward rotor cavity 42 by linking the buffer cavity to an even lower pressure area near the engine's flow path with these six plenums. This link into the low pressure area will cause air from the forward rotor cavity 42 and the TOBI discharge cavity 50 to leak into the buffer cavity 56 via apertures 87 foremed in each of the six plenums of stator support 20 and out in the flow path. The flow discharging from these six plenums are accelerated and tangentially directed through the discharge outlets 88 formed at the end of the plenums. This air discharging from outlets 88 is directed to the dead rim area 90 of rotor disk 44 which serves to cool this area. The dead rim area of the rotor disk is the area at the outer diameter of the disk adjacent the slots supporting the turbine blades.

As is apparent from the foregoing the air discharging from the pressure sink defined by buffer cavity 56 through circumferentially spaced holes 92 formed in cylindrical member 94 together with the restricted flow into the six plenums separate these plenums from the forward rotor cavity 42 and open a path from the buffer 56 to the low pressure region. Spaced slots 91 formed in the cylindrical member 94 permit the air from the forward rotor cavity 42 to flow to the low pressure area through the five remaining plenums. Cylindrical member 92 supporting platens 68 and 72 is attached to stator 20 by the nut and bolt assemblies 38.

The remaining five plenums utilize the high pressure from the forward rotor cavity 42 for increased dead rim area cooling by directing this flow in these five plenums through tangentially oriented outlet ports identical to the ones utilized in the other six plenums. Because of the higher pressure in these five plenums these plenums provide the required dump into the engine's flow path needed to maintain sufficient cooling flow across the first stage rotor. This flow cam be adjusted to any desired level by changing the mix of bypass flow and buffer flow plenums by adding or subtracting the cover plates 82 and/or holes 84.

As is apparent from the foregoing, the buffer cavity serves as a pressure sink so that it is the lowest pressure in the area adjacent the TOBI although the pressure in the gas path is still lower. In the design of the gas turbine engine the following relationships of pressures of the various stations were efficacious;

Immediately upstream of the FRC—81%
The FRC—81%
The TDC—64%
The buffer cavity—63%
Adjacent the disk dead rim—48%

Since the buffer cavity pressure is the lowest pressure the flow into the buffer cavity is from the TOBI discharge cavity 50 and the forward rotor cavity 42. This assures that the foreign matter will not enter the TOBI discharge cavity 50 from the forward rotor cavity 42 and pollute the cooling air being admitted to the turbine disk 44 avoiding the potential of clogging the cooling holes in the internal passages of the turbine blades (not shown) attached to the turbine disk 44 and causing less than ideal temperature and/or pressure of the TOBI discharge cavity air.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. Thrust balancing and anti-contamination means for a gas turbine engine including a cylindrical case, a combustor liner concentrically supported in said cylindrical case and defining a cooling air passageway; said gas turbine engine defining a gas path, a stator support defining a plurality of circumferentially spaced plenums attached to said cylindrical case, an engine shaft supported in said cylindrical case, a turbine rotor including a turbine disk mounted on said engine shaft for rotary movement, a front rim support disk supported to said shaft and attached to said turbine disk for rotating therewith and defining with said cylindrical case a cavity receiving engine cooling air at a given pressure level, a plurality of circumferentially spaced tangential injecting passages in fluid communication with said cooling air passageway formed in said stator support, first seal means and second seal means attached to said front rim support disk and being in sealing relationship with said annular stator, said first seal means and said second seal means being in radially spaced relationship and defining a first subchamber and a second subchamber, third seal means attached to said front rim support disk and axially spaced from said first seal means and being in sealing relationship with said annular stator for defining a buffer cavity, means for leading cooling air from said second subchamber through openings on the inner diameter of said plenums through some of said plenums to said gas path, means for covering the inner diameter openings in a preselected number of said plenums and interconnecting said buffer cavity with said covered plenums through an opening formed in said stator whereby the pressure in said buffer cavity is lower than said first subchamber and said second subchamber so that leakage flow across said first and third seal means prevents leakage flow from said second subchamber into said first subchamber.

2. Thrust balancing and anti-contamination means as claimed in claim 1 wherein said first seal means, said second seal means and said third seal means are labyrinth seals.

3. Thrust balancing and anti-contamination means as claimed in claim 2 including an annular rotor support means adjacent to said cavity attached to said stator support and extending radially in close proximity to said engine shaft whereby the rotor tips are protected from injury upon disassembly of said gas turbine engine.

4. Thrust balancing and anti-contamination means as claimed in claim 3 including an annular and axially extending member attached at one end to said stator support for supporting the stationary portion of said labyrinth seals of said second seal means and of said third seal means.

5. Thrust balancing and anti-contamination means as claimed in claim 4 including a dead rim area on said turbine disk, said plenums including outlet passages for leading cooling air onto said dead rim area.

6. Thrust balancing and anti-contamination means as claimed in claim 5 wherein said outlet passages are oriented to discharge the flow tangentially relative to said front rim disk support.

* * * * *